Dec. 30, 1941. H. C. KRONE ET AL 2,268,407
SELF-LOCKING HOSE COUPLING
Filed June 13, 1941 2 Sheets-Sheet 2

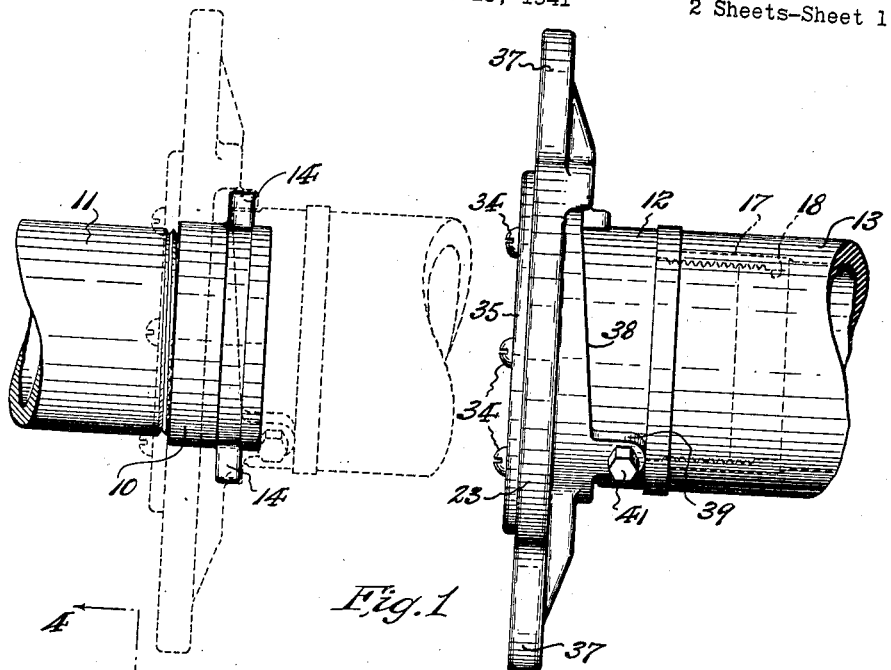
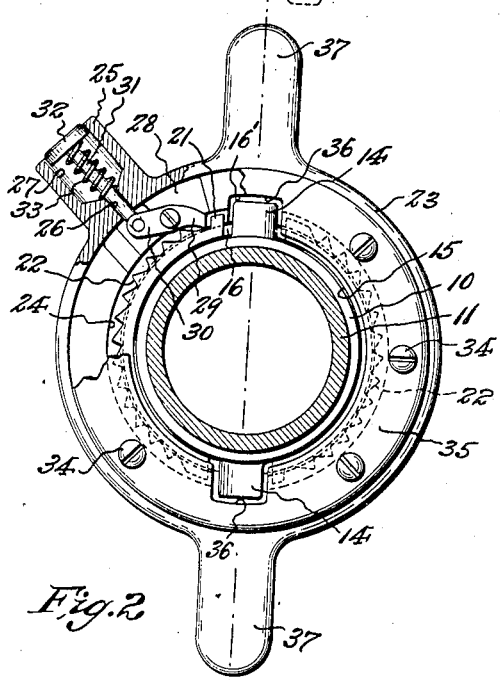
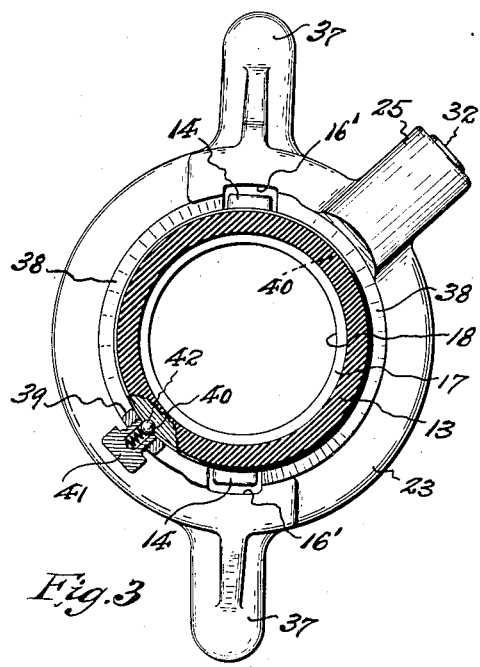

INVENTORS:
Howard C. Krone & William Meyer,
BY George D. Richards
ATTORNEY.

Patented Dec. 30, 1941

2,268,407

UNITED STATES PATENT OFFICE 2,268,407

SELF-LOCKING HOSE COUPLING

Howard C. Krone, River Edge, and William Meyer, East Orange, N. J., assignors to A. W. Wheaton Brass Works, Newark, N. J., a corporation of New Jersey Application June 13, 1941, Serial No. 397,884

5 Claims. (Cl. 285—175)

This invention relates to improvements in pipe or hose couplings; and the invention has reference, more particularly, to a novel quick acting and self-locking coupling for connecting adjacent pipe or hose sections.

This invention has for an object to provide an easily manipulatable and quick acting pipe or hose coupling which is not only self-sealing as to the joint formed between the coupling parts, but which is also self-locking against accidental loosening or separation of said parts.

This invention has for another object to provide connectible male and female coupling members having cooperating means for moving the same axially into sealing relation, one said means being rotatively mounted on one coupling member and having cam portions to thrustingly engage lugs carried by the other coupling member and which constitute the other said means, said rotative means being provided with a releasable lock means to hold or lock the same in operative coupling member joining and sealing position.

Other objects of this invention, not at this time more particularly enumerated, will be understood from the following detailed description of the same.

An illustrative embodiment of this invention is shown in the accompanying drawings in which:

Fig. 1 is a side elevational view showing in full lines the coupling members in separated relation, but showing by dotted lines the female coupling member applied to the male coupling member ready to be locked up.

Fig. 2 is an end elevation viewed from left to right in Fig. 1, and showing the pipe which carries the male coupling member in cross section;

Fig. 3 is an end elevation viewed from right to left in Fig. 1, and showing the hose which carries the female coupling member in cross section.

Similar characters of reference are employed in the above described views, to indicate corresponding parts.

Figure 5:
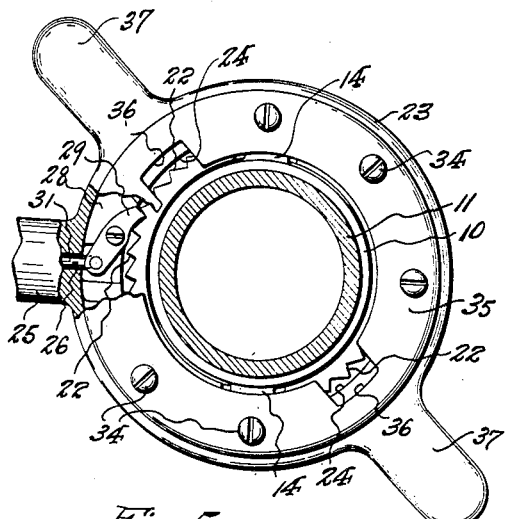
Fig. 5 is an end elevation similar to that of Fig. 2, but showing the coupling members locked up.
Figure 6:
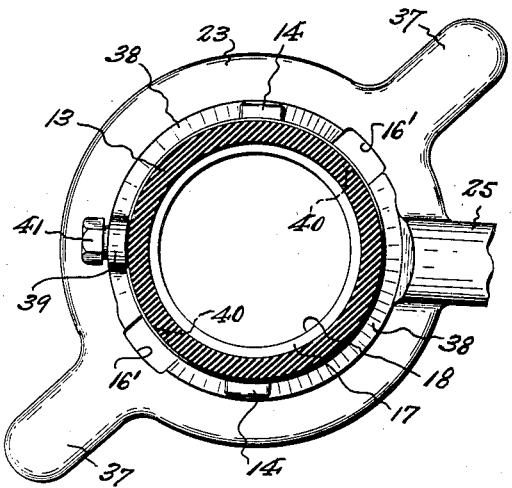
Fig. 6 is an end elevation similar to that of Fig. 3, but showing the coupling members locked up.

Referring to the drawings, the novel coupling comprises a male coupling member 10 adapted to be connected, in any suitable manner, to an end of a pipe or hose section 11 to be served thereby, and a cooperating female member 12 adapted to be connected, also in any suitable manner, to an end of a pipe or hose section 13 to be served thereby.

The male coupling member 10 is of hollow cylindrical form and is provided adjacent to its free end with radially and externally projecting coupling lugs 14, preferably provided to extend from opposite sides of the body thereof.

The female coupling member 12 comprises a hollow cylindrical body having an outwardly open receiving socket 15 sized to permit entrance thereinto of the male coupling member 10, and having in its walls open indenting slots 16, leading inwardly from its free end, to receive the coupling lugs 14 of said male coupling member 10, whereby the latter may project laterally and exteriorly therefrom when said male coupling member is entered in said socket 15 of the female coupling member. At its rearward end, the female coupling member is provided with a tubular extension 17 which provides a fluid passage 18 adapted to communicate with the passage of the male coupling member; said extension 17 also serving to receive connection of the pipe or hose section 13 to be served by the female coupling member. At its interior or rearward end, the socket 15 of the female coupling member is provided with a seat 19 for supporting an annular sealing gasket 20 adapted to be engaged by the free end of the male coupling member, when the latter is entered in the female coupling member. At its forward or free end, said female coupling member is provided with an annular laterally projecting flange 21, which is interrupted at the mouths of the indenting slots 16. Formed along the periphery of this flange 21 are a plurality of locking serrations or teeth 22.

Rotatably mounted upon the female coupling member, behind the toothed flange 21 thereof, is a thrust ring 23 which is provided in its outer face with a countersunk annular channel or way 24 to receive said toothed flange 21. Indenting the internal periphery of said thrust ring 23 are channels or ways 16′ which are normally aligned with and opposed to the slots of the female coupling member to admit passage of the male coupling member lugs 14 therethrough, when said male coupling member is inserted into the female coupling member. Extending radially from the periphery of said thrust ring 23 is an outwardly open extension 25 having at its inner end a slideway passage 26, extending between the chamber 27 thereof and an inner housing chamber 28 formed in the body of said thrust ring 23 outwardly of the channel or way 24.

Pivotally mounted in said inner housing chamber 28, for cooperation with the teeth 22 of the flange 21, is a locking-pawl 29 having a tail-piece 30. Pivotally coupled with the tail-piece 30 of said locking-pawl is the stem 31 of a release button 32. Said stem 31 extends slidably through said slideway passage 26 and toward the outer open end of the extension chamber 27, and affixed to the outer extremity of said stem 31 is said release button 32, in such manner that the same is normally disposed at and substantially within the outer open end of said chamber 27, thus being guarded by the surrounding walls of the extension 25 against contacts which might accidentally inwardly move the same and its stem 31 with inadvertent locking-pawl releasing effect. A compression spring 33 surrounding the stem 31 between the bottom of the extension chamber 27 and the release button 32, thrusts the stem and button outward whereby to yieldably urge the locking-pawl toward and for cooperation with the teeth 22 of the flange 21. Secured to the front face of the thrust ring 23, by means of fastening screws 34 or other suitable fastening means, is an annular keeper plate 35 which abuts the forward end of the female coupling member 12 and its toothed flange, thereby retaining the thrust ring in proper operative assembled relation to the female member, and so as to be supported against axial displacement when functionally manipulated. The internal periphery of said keeper plate 35 is provided with indenting gate notches 36, which, are normally registered with the entrances of the slots 16 of the female coupling member whereby to admit the male coupling member lugs 14 for movement through the channels or ways 16' of the thrust ring 23 and into said slots 16, when the male coupling member is inserted into the female coupling member. Preferably said thrust ring 23 is provided with one or more radially projecting handle or lever arms 37 for facilitating manipulated rotation thereof in use.

Provided to project from the rear face of said thrust ring 23, to extend around the opening thereof from one channel or way 16' to the other, are thrust cam members 38, the faces of which constitute inclined planes adapted to engage and thrust inwardly the male coupling member lugs 14, when the thrust ring is rotated in anti-clockwise direction (as viewed in Fig. 2) after the male coupling member is inserted into the female coupling member.

In order to yieldably retain the thrust ring 23 in a normal initial position in which its channels or ways 16' register with the slots 16 of the female coupling member, one of said thrust cam members 38 is provided, adjacent its high end, with a rearwardly extending carrier ear 39 which overhangs the external circumferential surface of said female coupling member, in the area thereof which is rearwardly beyond the inner ends of the slots 16 thereof. In this area are suitably positioned diametrically opposite check recesses 40. A hollow plug 41 is threaded through said ear 39 to carry a spring pressed detent element 42. When the thrust ring is turned to a normal initial position wherein its channels or ways 16' and the keeper plate gate notches 36 register with the slots 16 of the female member, the spring urged detent element 42 will engage in either one or the other of said recesses, so as to yieldably hold the thrust ring in such normal initial position while the male coupling member is being inserted into the female coupling member ready to be locked thereto by rotative manipulation of said thrust ring.

Figure 4:
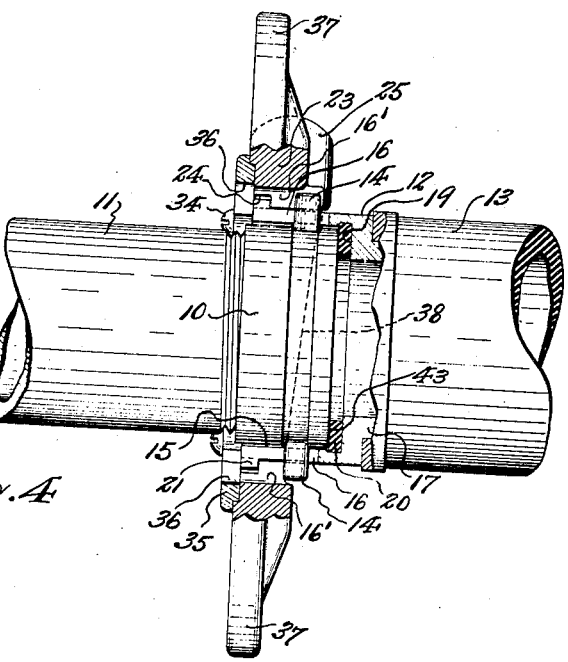
Fig. 4 is a vertical sectional view, taken on line 4—4 in Fig. 2.

In the operation of the coupling, the male coupling member 10 is inserted in the receiving socket 15 of the female coupling member 12 until its free end 43 (see Fig. 4) abuts the sealing gasket 20 at the bottom of said receiving socket 15. In thus entering the male coupling member into the female coupling member, the lugs 14 of the latter pass through the gate notches 36 and slots 16' of the keeper plate thrust ring assembly, so as to engage in the slots 16 of the female coupling member through which they radially project so as to lie adjacent to the low points of the thrust cam members 38 of the thrust ring subject to engagement thereby. The male coupling member having been thus entered into the female coupling member, the operator thereupon rotates the thrust ring 23 in anti-clockwise direction (as viewed in Fig. 2), thus moving the thrust cam members 38 behind and against the lugs 14 of said male coupling member. The inclined plane faces of said thrust cam members 38, when thus moved across and against said lugs 14, exert a forceful forwardly urging pressure upon said lugs which is transmitted to the male coupling member so as to firmly and tightly press the free end 43 of the latter into sealing contact with the sealing gasket 20. As the thrust ring 23 is thus operatively rotated, the locking-pawl 29 rides over teeth 22 of the flange 21 of the female coupling member, so as to fall behind one of said teeth when the thrust ring attains the limit of inward thrusting pressure which is sufficient to sealingly compress the sealing gasket between the male and female coupling members, thereby locking the thrust ring against reverse movement and consequent relaxation of said sealing compression.

When it is desired to separate the coupling members, the operator merely presses inwardly upon the release button 32, whereby to thrust inwardly the stem 31, and thus swing away the locking-pawl 29 from the engaged tooth of the female coupling member flange 21. Such operation releases the thrust ring 23 for reverse rotation back to normal initial position, thus disengaging the thrust cam members 38 from the lugs 14 of the male coupling member, and aligning the channels or ways 16' and gate notches 36 with the latter, so as to permit their outward withdrawal, and entailed separation of the male coupling member from the female coupling member.

It will be obvious that many changes could be made in the above described constructions and many apparently widely different embodiments of this invention could be made without departing from the scope thereof. It is therefore intended that all matter contained in the above description or shown in the accompanying drawings shall be interpreted as illustrative and not in a limiting sense.

We claim:

1. A self-locking coupling comprising, a female coupling member and a male coupling member adapted to be entered therein, said male member having lugs radially projecting therefrom and said female member having ways to receive said lugs through which the latter project, a thrust ring means rotatably mounted on said female member whereby to engage said lugs to thrust the male member into tightly joined relation to said female member, and cooperative means connected with said female member and said thrust ring means for releasably locking the latter in actuated condition for joining said coupling members.

2. A self-locking coupling comprising, a female coupling member and a male coupling member adapted to be entered therein, said male member having lugs radially projecting therefrom and said female member having ways to receive said lugs through which the latter project, a thrust ring means rotatably mounted on said female member whereby to engage said lugs to thrust the male member into a tightly joined relation to said female member, said thrust ring means having a releasable locking-pawl means, and said female member having toothed means adapted to be engaged by said locking-pawl means.

3. A self-locking coupling comprising, a male coupling member, a female coupling member having an outwardly open socket to receive said male member, said male member having lugs radially projecting therefrom and said female member having ways to receive said lugs through which the latter project, a rotatable thrust ring means mounted on said female member whereby to engage said lugs to thrust the male member into tightly joined connection with said female member, said thrust ring means having lug passage ways normally registered with said ways of said female member, means to yieldably position said thrust ring means so as to align its lug passage ways with said ways of said female member, and cooperative means connected with said female member and said thrust ring means for releasably locking the latter in actuated condition for joining said coupling member.

4. A self-locking coupling comprising, a male coupling member, a female coupling member having an outwardly open socket to receive said male member, said male member having lugs radially projecting therefrom and said female member having ways to receive said lugs through which the latter project, a rotatable thrust ring means mounted on said female member whereby to engage said lugs to thrust the male member into tightly joined connection with said female member, said thrust ring means having lug passage ways normally registered with said ways of said female member, means to yieldably position said thrust ring means so as to align its lug passage ways with said ways of said female member, toothed flange means on said female member adapted to be embraced by said thrust ring means, a pivoted locking-pawl carried by said thrust ring means to cooperate with said toothed flange means, and manipulatable means to release said locking-pawl from operative engagement with said toothed flange means.

5. A self-locking coupling comprising, a male coupling member, a female coupling member having an outwardly open socket to receive said male member, a sealing gasket within said socket adapted to be engaged by said male member, said male member having lugs radially projecting therefrom and said female member having ways to receive said lugs through which the latter project, a rotatable thrust ring means mounted on said female member whereby to engage said lugs to thrust the male member into joint sealing engagement with said sealing gasket, said thrust ring having lug passage ways normally registered with said ways of said female member, means to yieldably position said thrust ring means so as to align its lug passage ways with said ways of said female member, toothed flange means on said female member adapted to be embraced by said thrust ring means, a pivoted locking-pawl carried by said thrust ring means to cooperate with said toothed flange means, an outwardly open housing extension on said thrust ring means having a slideway, a stem extending from the interior of said housing extension through said slideway for operative connection with said locking-pawl, a release button on the outer end of said stem, and spring means thrusting outwardly on said button and stem whereby to yieldably urge said locking-pawl into engagement with said toothed flange means, said release button being guarded by the walls of said housing extension against accidental inwardly thrusting locking-pawl releasing movement.

HOWARD C. KRONE.
WILLIAM MEYER.